Sept. 15, 1942.  F. A. KLEIN  2,296,166
SEED DUSTER
Filed Dec. 15, 1941  2 Sheets—Sheet 2
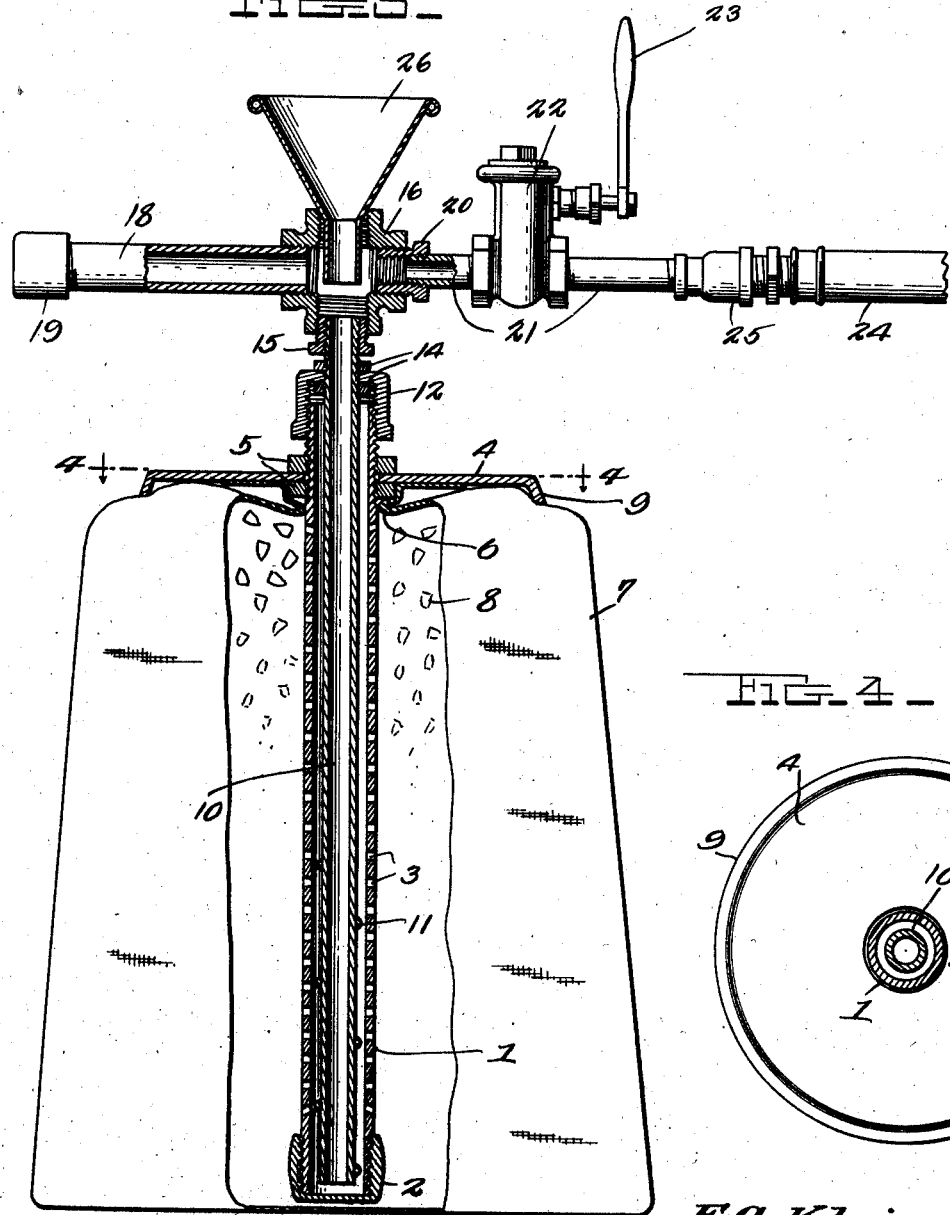
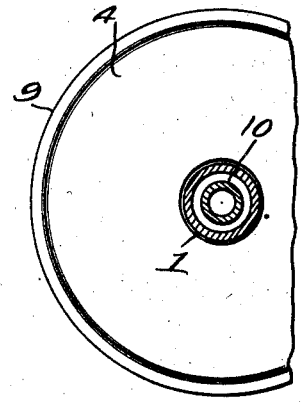
F. A. Klein,
INVENTOR.

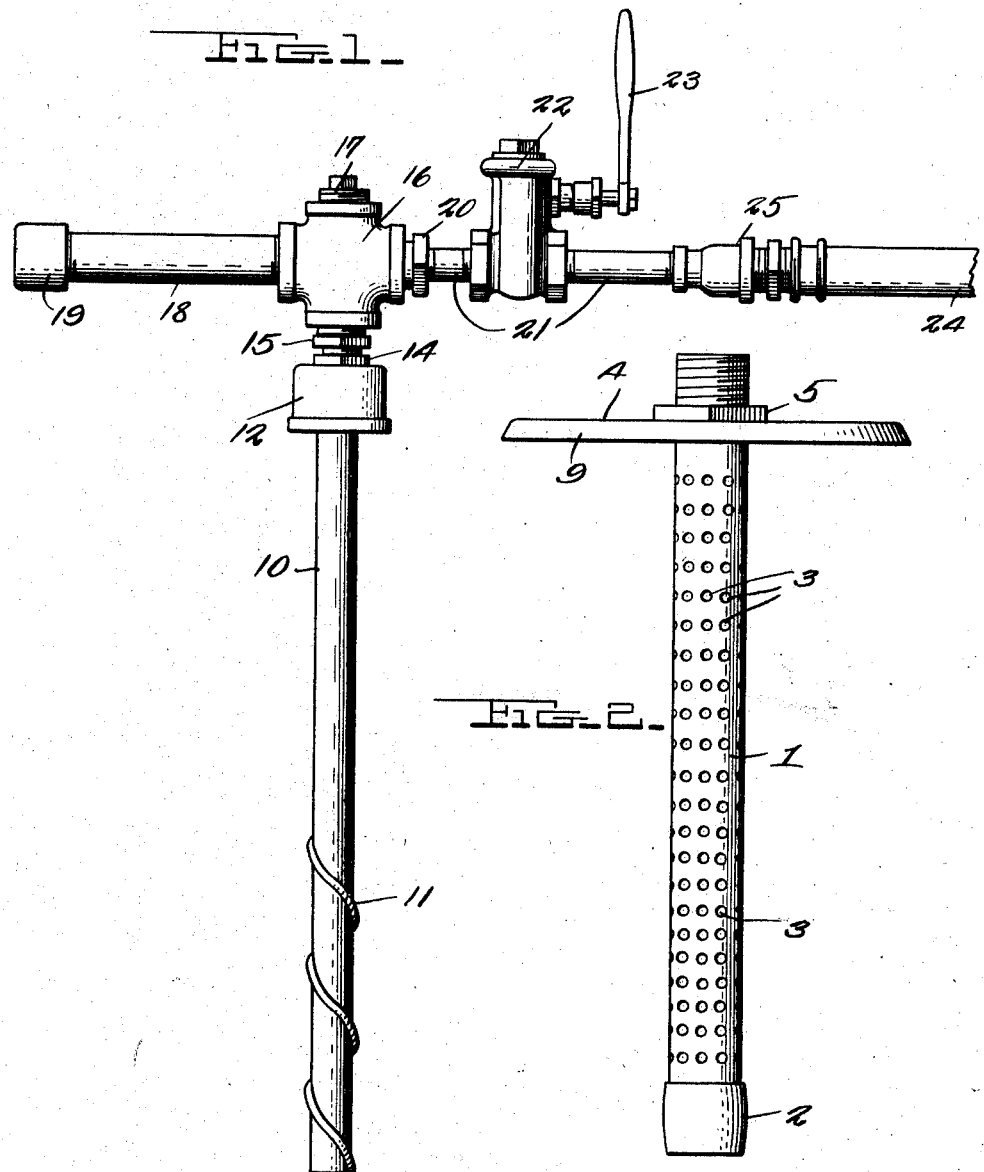

Patented Sept. 15, 1942

2,296,166

UNITED STATES PATENT OFFICE 2,296,166

SEED DUSTER

Frank A. Klein, Keota, Iowa

Application December 15, 1941, Serial No. 423,107

3 Claims. (Cl. 83—28)

It is customary to treat seed corn and small grain used for seed purposes, with some disinfectant, in the form of a dust, for the purpose of controlling root diseases. Application of dust type disinfectants always has been a difficult and disagreeable task, and a task which is somewhat dangerous to the operator, because some of the dust is inhaled.

The present invention aims to provide a seed duster which will overcome the objections noted, the device being manufactured cheaply, and containing no parts likely to get out of order or to call for expert machine work.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 1 shows in elevation, a device constructed in accordance with the invention;

Fig. 2 is an elevation showing the distributor and attendant parts;

Fig. 3 is a vertical sectional view wherein parts are in elevation, a funnel being in place to deliver the dust into the machine;

Fig. 4 is a section on the line 4—4 of Fig. 3.

The device forming the subject matter of this application preferably is made of metal. It includes a tubular distributor 1, closed at its lower end by a cap 2, the distributor being provided with perforations 3 arranged circumferentially of the distributor and extending throughout practically the entire length of that member. A disklike head 4 is secured by nuts 5 to the distributor 1, near the upper end of the distributor. The distributor is adapted to be thrust downwardly into the restricted mouth 6 of a sack 7 containing seed corn or other grain, indicated at 8. In order that contact between the head 4 and the top of the sack 7 may be as nearly airtight as possible, the head 4 is provided with a marginal, depending flange 9, adapted to secure a good hold on the upper part of the sack.

A discharge tube 10, of less diameter than the distributor 1, is disposed coaxially within the distributor and extends downwardly to a place closely adjacent to the cap 2. Throughout a portion of its length, upwardly from its lower end, the discharge tube 10 is supplied with a spiral, outstanding rib 11, the function of which will be made manifest hereinafter. A cap 12 and nuts 14 attach the discharge tube 10 to the upper end of the distributor 1.

The discharge tube 10 extends upwardly with respect to the cap 12 and is connected by a coupling 15 to the lower branch of a cross 16. When the device is in use, that is, during the dusting operation, the upper branch of the cross 16 is closed by a removable plug 17.

Into one lateral branch of the cross 16 is threaded a tubular handle 18, closed by a cap 19 and disposed at right angles to the distributor 1 and the discharge tube 10. By means of a coupling 20, one end of a rigid conduit 21 is secured to the opposite lateral branch of the cross 16, the conduit 21 being in axial alinement with the handle 18. A valve mechanism 22 is interposed in the conduit 21 and is actuated, at the will of an operator, by any suitable means indicated at 23. The conduit includes a flexible part 24, joined to the rigid member by a coupling 25. Through the conduit 24—21, air under pressure is supplied from any suitable source, forming no part of the present invention, degree of pressure being subject to the kind of grain that is to be dusted.

The distributor 1 and attendant parts are thrust downwardly into the material 8 in the sack 7, until the cap 2 is very close to the bottom of the sack. The closure plug 17 is removed, and its place is taken by a funnel 26. By means of the funnel, any desired amount of dusting material may be introduced into the discharge tube 10. The plug 17 is replaced in the cross 16. The valve mechanism 22 is operated by a handle 23, and a puff or two of air is admitted by way of the conduits 24—21 and the cross 16, into the discharge tube 10. The dust moves out of the lower end of the discharge tube 10 and passes upwardly, the dust finding its way into the grain 8, by way of the perforations 3 of the tubular distributor 1. The air, laden with dust, moves outwardly in a radial direction, and the grain 8 is thoroughly dusted from the vertical axis of the sack to the perimeter of the mass of grain, the sack 7 having sufficient porosity to permit the passage of air.

The spiral rib 11 is a highly useful part of the device. It retards upward movement of the dust laden air, between the distributor 1 and the tube 10. The dust laden air, therefore, is discharged to a proper amount through the lower perforations 3 of the distributor 1, as well as through the upper perforations. At the same time, the upward movement of the dust laden air is not retarded unduly and the contents of the sack receives a thorough dusting from top to bottom. In the absence of the rib 11, the air, rebounding vertically and upwardly from the cap 2, would discharge too much dusting material adjacent to the top of the sack, and too little dusting material adjacent to the bottom of the sack, by way of the perforations 3.

The device is simple in construction but will be found thoroughly advantageous for the ends in view. The part 18 and the rigid conduit 21, or the part 18 alone, may be gripped by an operator, to force the distributor 1 and associated parts downwardly into the contents of the sack 7.

Having thus described the invention, what is claimed is:

1. A device for applying a dust-like treating material to grain in a sack, comprising a tubular distributor having side wall perforations and closed at its lower end, a discharge tube in the distributor and having an open lower end disposed close to the closed lower end of the distributor, means for closing the upper end of the distributor, about the tube, means for admitting dust-like treating material to the tube at the will of an operator, means for supplying air under pressure to the upper part of the tube, at the will of an operator, and a spiral rib surrounding the lower portion of the tube, within the distributor, and constituting means for securing a dust discharge through the lower portion of the perforations, without checking too much the flow through the upper portion of the perforations.

2. A device for applying a dust-like treating material to grain in a sack, comprising a tubular distributor having side wall perforations and closed at its lower end, a discharge tube in the distributor and having an open lower end disposed close to the closed lower end of the distributor, means for closing the upper end of the distributor, about the tube, means for admitting dust-like treating material to the tube at the will of an operator, means for supplying air under pressure to the upper part of the tube, at the will of an operator, and a disk-like head carried by the distributor and located near the upper end thereof, the head approaching closely in diameter, the diameter of the upper end of the sack wherewith the device is used, and having a depending, marginal, annular, sack-engaging flange.

3. A device for applying a treating material to grain in a sack, comprising a tubular distributor having side wall perforations and closed at its lower end, a discharge tube in the distributor and having an open lower end disposed close to the closed lower end of the distributor, means for closing the upper end of the distributor, about the tube, means for admitting treating material to the tube at the will of an operator, means for supplying fluid under pressure to the upper part of the tube, at the will of an operator, and a spiral rib surrounding the lower portion of the tube, within the distributor, and constituting means for securing a discharge through the lower portion of the perforations, without checking too much the flow through the upper portion of the perforations.

FRANK A. KLEIN.